United States Patent
Stapela et al.

(10) Patent No.: US 12,325,638 B2
(45) Date of Patent: Jun. 10, 2025

(54) PYROLYSIS OF POLYMER WASTE MATERIALS

(71) Applicant: MICROWAVE SOLUTIONS GMBH, Riehen (CH)

(72) Inventors: Annelie Stapela, Riehen (CH); Mathys Johannes Rossouw, Rayton Gauteng (CA)

(73) Assignee: MICROWAVE SOLUTIONS GMBH, Riehen (CH)

( * ) Notice: Subject to any disclaimer, the term of this patent is extended or adjusted under 35 U.S.C. 154(b) by 430 days.

(21) Appl. No.: 17/440,072

(22) PCT Filed: Mar. 19, 2020

(86) PCT No.: PCT/EP2020/057602
§ 371 (c)(1),
(2) Date: Sep. 16, 2021

(87) PCT Pub. No.: WO2020/188031
PCT Pub. Date: Sep. 24, 2020

(65) Prior Publication Data
US 2022/0184854 A1    Jun. 16, 2022

(30) Foreign Application Priority Data
Mar. 19, 2019   (CH) ..................... 00342/19

(51) Int. Cl.
*C10B 53/07*   (2006.01)
*B01J 6/00*    (2006.01)
(Continued)

(52) U.S. Cl.
CPC ............. *C01B 33/126* (2013.01); *B01J 6/008* (2013.01); *B01J 19/126* (2013.01); *B29B 17/04* (2013.01);
(Continued)

(58) Field of Classification Search
CPC .......... C10B 19/00; C10B 53/07; C10B 57/02
See application file for complete search history.

(56) References Cited

U.S. PATENT DOCUMENTS 3,843,457 A * 10/1974 Grannen ................... C10L 5/46
                                                          201/37
4,718,358 A *  1/1988 Nomi ....................... H05B 6/80
                                                          110/346
(Continued)

FOREIGN PATENT DOCUMENTS

KR   10-2012-0050292 A    5/2012
KR      101463002    * 11/2014   ............ Y02W 30/62
(Continued)

OTHER PUBLICATIONS

KR 101463002 Espacenet Machine Translation Obtained Nov. 4, 2024. (Year: 2024).*
(Continued)

*Primary Examiner* — Jonathan Miller
(74) *Attorney, Agent, or Firm* — Birch, Stewart, Kolasch & Birch, LLP

(57) ABSTRACT

A pyrolysis method and a pyrolysis reactor for thermal decomposition of polymer waste materials, particularly rubber and plastics waste materials, using a fast pyrolysis process, are disclosed. The waste material is delivered to a pyrolytic chamber, and is heated to a decomposition temperature of the waste material by microwave radiation.

22 Claims, 4 Drawing Sheets

Figure 1:
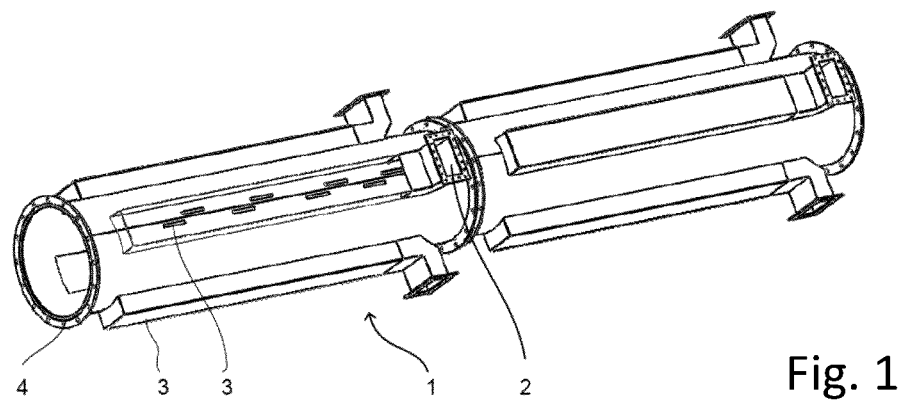

(51) Int. Cl.
*B01J 19/12* (2006.01)
*B29B 17/04* (2006.01)
*C01B 33/12* (2006.01)
*C10B 19/00* (2006.01)
*C10B 57/02* (2006.01)
*F23G 7/12* (2006.01)
*B29K 309/02* (2006.01)
*B29L 30/00* (2006.01)

(52) U.S. Cl.
CPC .............. *C10B 19/00* (2013.01); *C10B 53/07* (2013.01); *C10B 57/02* (2013.01); *F23G 7/12* (2013.01); *B29B 2017/0496* (2013.01); *B29K 2309/02* (2013.01); *B29L 2030/00* (2013.01); *F23G 2204/203* (2013.01); *F23G 2209/28* (2013.01)

(56) References Cited

U.S. PATENT DOCUMENTS

| | | | | |
|---|---|---|---|---|
| 5,084,141 | A * | 1/1992 | Holland | B01J 19/126 201/35 |
| 5,330,623 | A * | 7/1994 | Holland | C10B 19/00 423/449.1 |
| 5,366,595 | A * | 11/1994 | Padgett | C10B 1/10 202/83 |
| 5,507,927 | A * | 4/1996 | Emery | C10G 1/00 204/157.43 |
| 8,038,848 | B2 * | 10/2011 | Bohr | C10B 53/07 202/133 |
| 8,282,787 | B2 * | 10/2012 | Tucker | C10B 53/00 95/114 |
| 9,193,916 | B2 * | 11/2015 | Bar-Ziv | C10B 47/44 |
| 9,545,609 | B2 * | 1/2017 | Van Thorre | C10G 1/08 |
| 9,649,613 | B2 * | 5/2017 | Kantor | B01J 19/126 |
| 2008/0141589 | A1 * | 6/2008 | Farneman | C10B 53/07 48/197 FM |
| 2008/0230365 | A1 * | 9/2008 | Bohr | C10B 53/07 202/99 |
| 2011/0036706 | A1 * | 2/2011 | Van Thorre | C10G 1/10 422/186.29 |
| 2011/0192989 | A1 * | 8/2011 | Yaniv | H05B 6/78 250/453.11 |
| 2011/0219679 | A1 * | 9/2011 | Budarin | C10C 5/00 422/186 |
| 2011/0290788 | A1 * | 12/2011 | Klemarewski | C10L 9/083 219/678 |
| 2013/0032464 | A1 * | 2/2013 | Kasin | C10K 3/02 202/112 |
| 2013/0144095 | A1 * | 6/2013 | Farneman | C10B 53/07 422/186 |
| 2013/0156655 | A1 * | 6/2013 | Van Thorre | B01J 19/126 422/186.29 |
| 2014/0053458 | A1 * | 2/2014 | Bar-Ziv | C10B 57/02 44/589 |
| 2015/0313273 | A1 * | 11/2015 | Stromotich | A23B 4/01 34/259 |
| 2016/0200982 | A1 * | 7/2016 | Doucet | C10B 53/00 201/17 |

FOREIGN PATENT DOCUMENTS

WO    WO 01/03473 A1    1/2001
WO    WO 2018/177994 A1    10/2018

OTHER PUBLICATIONS

International Search Report, issued in PCT/EP2020/057602, dated Jun. 2, 2020.
Undri et al., "Upgraded fuel from microwave assisted pyrolysis of waste tire", Fuel, 2014, vol. 115, pp. 600-608.
Written Opinion of the International Seaching Authority, issued in PCT/EP2020/057602, dated Jun. 2, 2020.

* cited by examiner

PYROLYSIS OF POLYMER WASTE MATERIALS

The invention relates to a pyrolysis method and a pyrolysis reactor for thermaldecomposition of polymer materials and polymer waste materials.

Recycling of polymeric waste material, particularly rubber and plastics waste material, poses an environmental challenge, due to an increasing volume of scrap from such materials being produced annually. Polymeric waste materials disposed in land fill remain in the environment for hundreds of years and contribute the environmental pollution. Waste incineration may release toxic emissions, which require additional treatment. Therefore, waste management for polymeric waste materials is difficult and expensive.

For example the most common rubbers used in the manufacture of tires are natural rubber (NR), cis-polybutadiene rubber (CBR), isobutylene-isoprene copolymer rubber (i.e., butyl rubber (BR)) and styrene-butadiene copolymer rubber (SBR). These synthetic rubber compounds comprised of cross-linked long-chain polymers with sulphur atoms which make the elastomers chemically stable and, therefore, limit their degradability. Furthermore, the low density and elasticity of the rubber make it difficult to recycle and subsequently dispose off the material as it cannot be compacted. In addition to the synthetic rubber, the rubber fraction of tires usually contains natural rubber, carbon black, plasticizers, lubricants, antioxidants and inorganic materials such as calcium carbonate and silica, which add greater complexity to the sustainable waste management of the used tires.

For example rubber waste transformation is notoriously difficult to achieve in a way that: (1) improves the efficiency and sustainability of solid waste management operations and systems, (2) recovers reusable and recyclable materials, and (3) recovers conversion products and energy in the form of combustible biogas. When recycling waste rubber products the use of valuable raw materials should be minimized while at the same time consider environmental sustainability. Re-using of secondary raw materials is an important resource saving mechanism to create circular economies and thus reduce the demand on fossil fuels. In general, polymeric waste materials form a significant source of raw materials for new product production Existing recycling solutions prove to be either ineffective, energy intensive or require a significant investment in resource and infrastructure. For rubber for example a grinding process is often used to create crumb rubber. Despite its apparent simplicity, it is a very difficult process, not only to determine the nature, magnitude and direction of loads, but also to define and quantify the results of destruction. Multiple different types of elastic material, increases in temperature as well as occurring shear resistance can result in increased power consumption and intensive wear and tear. This in turn results in a low yield of marketable recycled material.

Cryogenic techniques may reduce energy consumption for grinding and separate reinforcing elements of products for the mechanical processing of rubber products and polymeric waste products in general. The main disadvantages of cryogenic processing methods are: High energy costs associated with the need to obtain a sufficient amount of a cryogenic liquid gas, and achieve and maintain a low temperature in a processing chamber. The large product sizes and low thermal conductivity of polymeric waste products lead to considerable process time. The cooling process as a whole and super cooling of the outer layers of material causes even greater increase in the total energy consumption while reducing the performance of the equipment. Therefore, in an overall life cycle assessment of the polymeric materials used in products and recycled at their end-of-life the requirement of sustainability mostly cannot be met by cryogenic recycling techniques.

Another known recycling method is vulcanization which is a chemical process for converting for example rubber or related polymers into more durable materials by the addition of sulphur or other equivalent curatives or accelerators. At the same time devulcanization is the process by which the polymer attributes of vulcanization are reversed. The process of regeneration is associated with a significant amount of harmful emissions. Reclaimed polymer compounds consist of a gel fraction, which preserves the sparse network structure of the vulcanization, and a sol fraction containing relatively short segments of branched chains. Since the network structure is maintained in regenerate vulcanization, the introduction of reclaimed polymers in a mixture to produce new polymer materials affects the strength properties of new materials. This results in a downcycling of the original material. In this regard, the regenerate is almost never used in the same industry, which is works against a circular economy.

Common methods to recycle for example vehicle tires include crumbing the rubber, burning the tires in furnaces as tyre derived fuel (TDF), or pyrolysis to decompose the tyre into pyrolysis oil, carbon black and the steel used in the construction of the tyre. Large industrial tires, such as those used by earth moving equipment, are difficult to recycle and are normally cut up into manageable sections before recycling by one of the aforementioned processes. There is significant wear on the equipment used to cut these tires.

Existing Pyrolysis methods use a maximum heat to decompose of rubber between 310-540° C. which produces recovered Carbon Black (rCB) with a Carbonaceous Residue, called Char, of 7%-20%, as an unwanted by-product of the rubber pyrolysis. Recovered Carbon Black can for example be used as a substitute filler for Virgin Carbon Black (vCB) in the tire manufacturing process. Unfortunately, the rCB's performance in application is compromised due to the presence of Char. Furthermore, volatiles produced in current pyrolysis methods are combined in a single condensate resulting in a less valuable feedstock. The existing pyrolysis processes operate in the slow pyrolysis regime, allowing further decomposition of the volatile components produced, which reduces the recovery yield.

Finally, a reverse depolymerisation process is described for example in U.S. Pat. No. 9,649,613 B2, wherein tires are loaded in succession into a microwave tunnel system with a conveyor. The tunnel system is provided with multiple small magnetrons, e.g. 35 rows of 3 magnetrons, each with 1.2 kW. The process is operated under slight positive pressure to encourage the movement of pyrolysis gases. It is believed that microwave energy results in the severing of weaker molecular bonds in longer chain molecules to reduce those molecules to simpler forms, which causes the depolymerisation process. Again, in the overall life cycle assessment of a recycling material mostly such a depolymerisation process is energetically not sustainable.

It is an object of the present invention to provide a pyrolysis method and a pyrolysis reactor for thermal decomposition of polymer materials and polymer waste materials, which allows for sustainable polymer waste management, recovery of energy in form of combustible biogas and efficient recovery of reusable and recyclable materials, which enables circular economies (re-use of by products in new product production) improves the environmental impact over the life cycle of a polymer material product, and which is a cost-efficient solution for polymer recycling. Particularly, it is an object of the present invention to provide a process where large polymer products, especially rubber tires, can be pyrolyzed as a whole.

These and other objects, which will appear from the description below, are achieved by a pyrolysis method and a pyrolysis reactor as set forth in the appended independent claims. Preferred embodiments are defined in the dependent claims.

According to the present invention a pyrolysis method for thermal decomposition of polymer materials and polymer waste materials, particularly rubber and plastics waste materials, uses a fast thermal pyrolysis process, preferably a sequential pyrolysis process, wherein the waste material is delivered to a pyrolytic chamber, and is heated to a decomposition temperature of the waste material (where an exothermic depolymerisation reaction of the waste material occurs) by microwave radiation. Preferably, the microwave radiation to heat the waste material to its decomposition temperature has a power density between 30 kW and 700 kW per cubic meter of the pyrolytic chamber. More preferably microwave radiation has a power density between 100 kW and 500 kW per cubic meter to ensure energy efficiency of the method and also thermal decomposition of the material. In general the microwave power selected for the fast pyrolysis process depends on the type of polymer waste material. For example, for tyre rubber material a power density between 50 kW and 500 kW per cubic meter is recommended.

In an advantageous variant, the pyrolysis method according to the present invention focuses on a material recovery for a polymer material or polymer waste material, particularly rubber waste material, which comprises a plurality of differing material components. The material is subjected to a sequential thermal decomposition of said differing material components by successively applying differing target temperatures corresponding to a target decomposition temperature of at least one of the plurality of individual material component. Since differing material components can decompose at differing temperatures, a target temperature equals the decomposition temperature of a specific component of the polymer waste material. Of course, two or more differing components may have the same or very similar decomposition temperature, which results in the same target decomposition temperature for the two or more differing components. The differing target temperatures can for example be applied in successive heating steps or in differing heat zones of a pyrolysis reactor. For each heating step or heat zone the temperature will be increased. So, over the course of the sequential thermal decomposition the target decomposition temperature for each of the differing material components of the waste material will be met.

The method according to the present invention is based on the fact that during the decomposition of different types of rubber present in a raw material, SBR decomposes mainly at high temperatures, natural rubber (NR) at lower temperatures whilst BR can be decomposed at both higher and lower temperatures. Therefore during a first heating stage of the reaction at a first temperature, the main by-products formed were produced by the decomposition of NR and BR while the compounds formed during a second heating stage at a temperature higher than in the first heating stage, mainly liquid fraction, were produced by the thermal decomposition of SBR and in low-proportion BR.

During the sequential thermal decomposition process differing volatile products gained from the pyrolysis of one or more differing material components at one target decomposition temperature may be extracted from the pyrolytic chamber. Thus, the differing volatiles can be recovered separate from each other. In the case of successive heating steps, the differing volatile products can be extracted during each step. In the case of successive heat zones, the differing volatile products can be extracted at different locations in a pyrolysis reactor which correspond to the heat zones.

According to one variant of a sequential decomposition process to pyrolyze for example rubber tires primarily microwave power is used in a partial vacuum to rapidly heat the rubber to different temperatures where depolymerisation starts for the different rubber components mixed into the tyre part, e.g. natural rubber, BR or SBR. Temperatures between 170-500° C. are mainly used, depending on the components pyrolyzed. The sequential decomposition of individual rubber components at different target temperatures together with the extraction of volatiles at the different target temperatures reduce the presence of Carbonaceous Residue (Char) on the Recovered Carbon Black (rCB) and allows the separation of the volatile fractions to be recovered.

Preferably, the pyrolysis method is controlled by a process control system that allows for accurate and differential heating of rubbers during the successive differing heating steps or transporting the waste material through successive heat zones.

In one variant of the pyrolysis method of a polymer waste material comprising a plurality of differing material components an initial mass of the differing material components is determined before decomposition starts. Alternatively, or additionally, after the thermal decomposition of differing material components of the polymer waste material a ratio of products resulting from the thermal decomposition of the differing material components is determined. The data of the initial component mass and/or the ratio of products is provided to the process control system to manage the pyrolysis process. Also, the temperature in the pyrolytic chamber may be monitored over time and/or at different zones in the chamber. For example, a power density of the microwave radiation and/or a residence time of products gained from the pyrolysis process are controlled according to a ratio of products resulting from the thermal decomposition of differing material components and/or a temperature applied in the pyrolytic chamber.

In a variant the method according to the present invention is characterized by a process to pyrolyze polymer material or polymer waste material, like rubber and plastics, primarily using microwave power to rapidly heat the rubber or plastics to temperatures where decomposition starts, depending on the material pyrolyzed this is 300-450° C. Subsequent heating to higher temperatures in a range of 600-900° C., may be achieved by a combination of microwaves and a further heating source. Thus, the pyrolysis method advantageously may comprise of a first heating step in which the waste material is heated to a first target decomposition temperature by microwave radiation as mentioned above, and a second heating step which is a subsequent step for heating the waste material to a second target temperatures above said first decomposition temperature by microwave radiation in combination with an additional heat source. Additional heat sources may be conductive heating means, electrical heating means or any other suitable heating means.

Advantageously, at last portions of volatile products gained from the pyrolysis process are used as additional heat source for conductive heating of the waste material in the pyrolytic chamber. Thus, for example gases evaporated during the first heating step and the initial decomposition may be used for the second heating step.

The combination of microwaves and an additional heat source may improve the overall energy efficiency of the method. The temperatures used for the pyrolysis method depend on the type of the polymer material or polymer waste material. For example, methane has a higher thermal capacity than hydrogen. Therefore, for a waste material evaporating large amounts of methane higher temperatures should be used than for hydrogen.

The two subsequent heating steps for example are helpful to optimize the decomposition process of different compounds of the polymer waste material. In the range of low-temperature pyrolysis, gas organic compounds are extracted from the waste material e.g. by dry distillation. For example additives, oils and softening agents evaporate during the initial thermal decomposition. In the range of high-temperature pyrolysis for example natural rubber, styrene-butadiene rubber or polybutadiene rubber may be regenerated during continued decomposition.

The pyrolysis method according to the invention is conducted in the fast pyrolysis regime, where advantageously volatile gases generated during pyrolysis are evacuated from the pyrolysis reactor in less than 4 seconds, preferably less than 2 seconds. The minimal contact time between pyrolysis gases and the hot environment in the reactor prevent further decomposition of the pyrolysis gases to solid compounds. This results in a large volatile yield, compared to slow pyrolysis where the carbon yield is higher. Using the volumetric heating properties of microwave power allows the polymeric waste material, particularly rubber, to be rapidly heated to the temperature range where an exothermic depolymerisation reaction occurs.

In an advantageous variant of the pyrolysis method according to the invention a negative pressure is applied to the pyrolytic chamber for removal or evacuation of pyrolysis gases. The evacuation of gases from the reactor is encouraged by drawing a partial vacuum in the off-gas lines. Preferably, a negative pressure of less than 0.4 bar absolute, more preferably between 0.1 and 0.3 bar is applied. Operating the pyrolysis process according to the present invention under negative pressure rapidly evacuates the volatile components from the heated chamber or chamber zones, preventing secondary thermal breakdown of volatiles that may cause the deposition of carbonaceous residues (Char) on the carbon black mixed into the tyre during manufacture and to be recovered, retaining the properties of the rCB for reuse. In addition, the negative pressure lowers the boiling point of the organic components, further preventing secondary thermal breakdown thereof.

The pyrolysis method described herein is a fast pyrolysis process that is suitable for accommodating whole rubber tires, large tyre pieces, rubber crumbs or with the pyrolysis reactor operated under reduced pressure to ensure rapid removal of pyrolysis gases.

According to a further aspect of the invention a pyrolysis reactor for thermal decomposition of polymer waste materials, particularly rubber and plastics waste materials, comprises a pyrolytic chamber for accommodating the waste material and at least one heat source for heating the waste material to a decomposition temperature, wherein the at least one heat source is a microwave radiation source.

In one variant of the pyrolysis reactor according to the invention the waste material is delivered through the pyrolytic chamber in a continuous motion by a conveyor. Thus, the waste material can be transported through subsequent heat zones along a length of the pyrolytic chamber that are each heated to successively higher target decomposition temperatures. Further, pyrolysis gases of the waste material are evacuated from the pyrolytic chamber in intervals during the continuous motion of the waste material at differing exit ports in the pyrolytic chamber. The exit ports may correspond to the differing heat zones, This will allow for physical separation of different volatile products during the thermal decomposition of the polymer waste materials.

Furthermore, the pyrolysis reactor may provide different storage systems for different volatile products gained from the pyrolysis process. Each system can be connected to a different heat zone or, in case of successive heating steps within the same reactor zone the reactor my switch between different storage systems for each heating step.

Preferably, the pyrolysis reactor according to the present invention comprises a process control system as mentioned above. The process control system may be connected to at least one temperature sensor in the pyrolytic chamber and/or to a mass measuring device for determining a mass of differing material components of the waste material. Thus, the process control system can control a sequential thermal decomposition process for differing material components by successively applying differing target temperatures in the pyrolytic chamber.

Furthermore, the speed of the waste material conveyor can also be controlled by the process control system. Advantageously, the conveyor is designed as a weigh feeder system comprising a mass measuring device for determining a mass of differing material components of the waste material fed into the pyrolytic chamber. The data of the mass measuring device is also provided for controlling the pyrolysis method.

The reactor is sealed to the environment to prevent pyrolysis gases escaping or oxygen entering. The reactor may be purged with e.g. nitrogen prior to operation.

The pyrolytic chamber of the pyrolysis reactor may comprise an internal refractory lining made from a microwave transparent material. The refractory lining can contain the heat around the polymer waste material being pyrolyzed. It also allows the microwave energy to disperse inside the pyrolytic chamber for more uniform heating of the product. In an advantageous variant the refractory lining extends to only a part of the length of the pyrolytic chamber where microwave radiation is introduced. The remaining part of the pyrolytic chamber may have a double wall construction instead for providing an additional heat source for the reactor walls.

The pyrolysis reactor comprises at least one waveguide feed comprising a plurality of radiation exits. The radiation exits preferably are diverted along a length of the pyrolytic chamber in a distance from each other.

In case of an elongated pyrolytic chamber of the pyrolysis reactor, a conveyor may be provided to feed polymer waste material into and through the pyrolytic chamber. Thus, the polymer waste material and its compounds respectively may be transferred along the length of the pyrolytic chamber from one end to an opposing end of the chamber. Further, the pyrolytic chamber may comprise several exit ports distanced from each other along a length of the pyrolytic chamber for evacuating pyrolysis gases of the waste material in intervals at differing exit ports.

Alternatively, the pyrolysis reactor may comprise a pyrolytic chamber in the form of a batch reactor having a circular shape. In this case preferably, the pyrolytic chamber has a ring shape having a hollow centre portion.

Figure 2A:
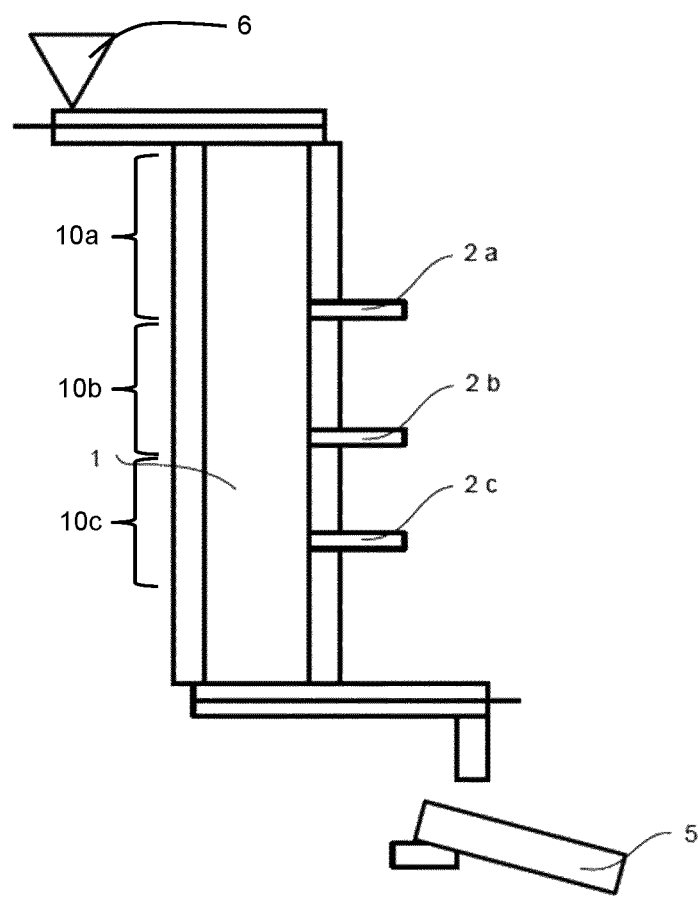
Figure 2B:
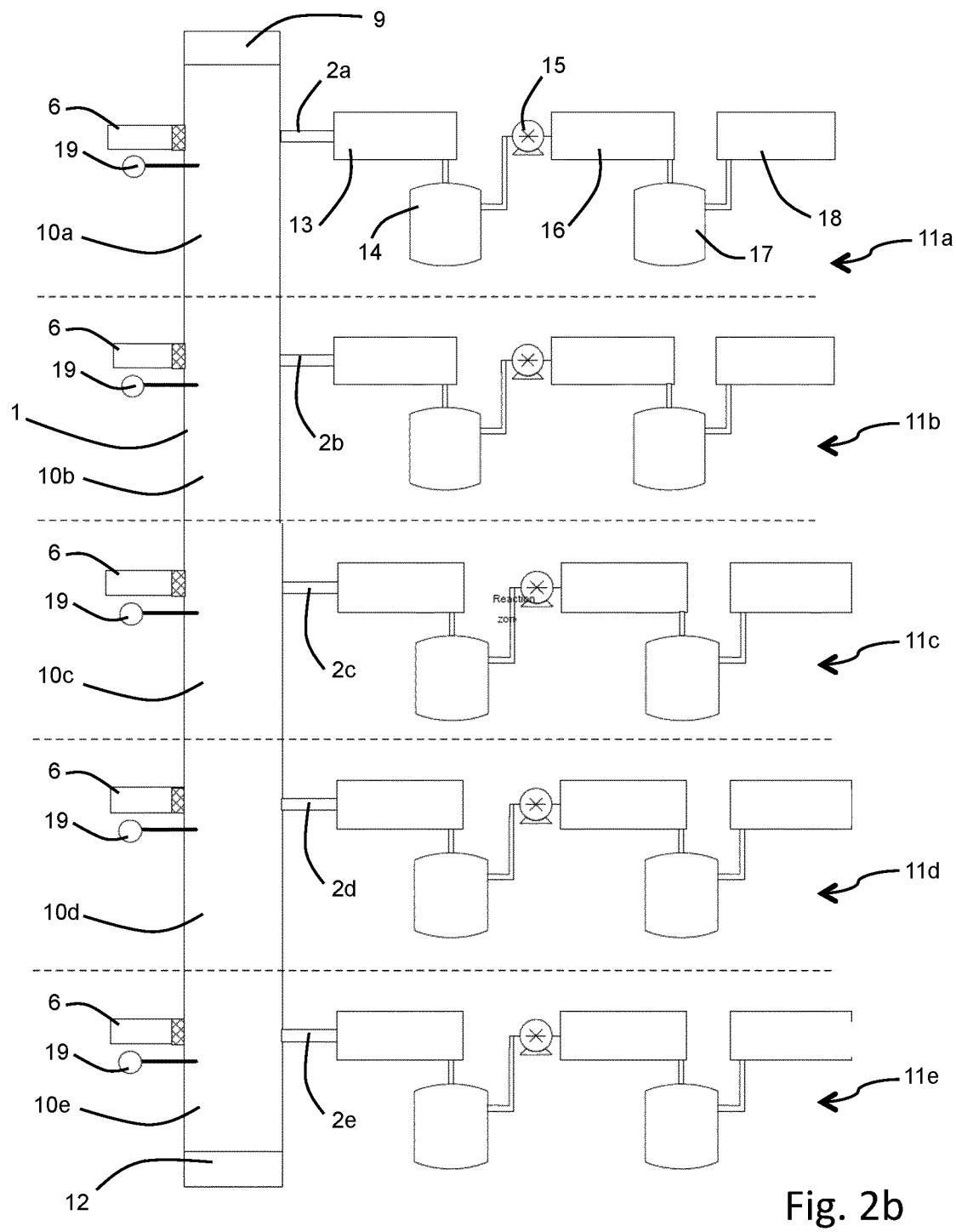
Figure 3A:
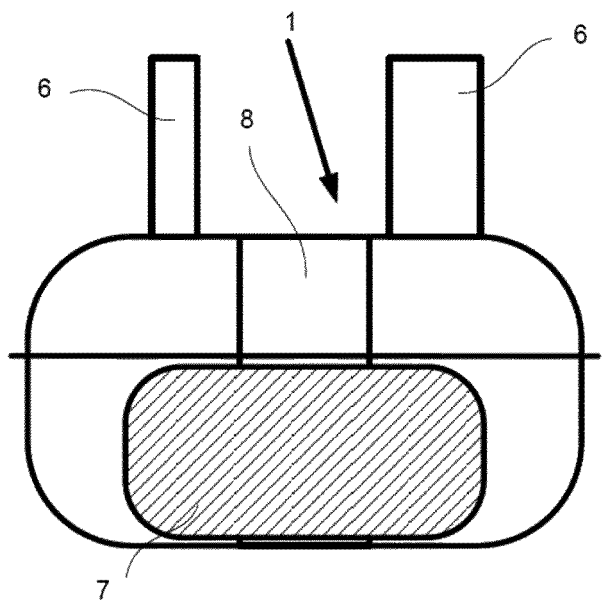
Figure 3B:
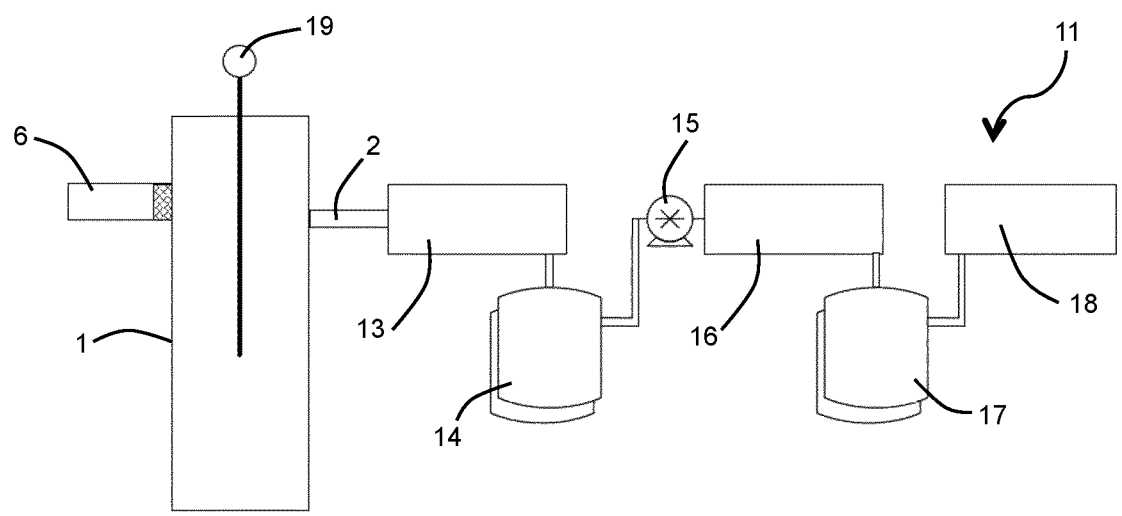
Figure 4:
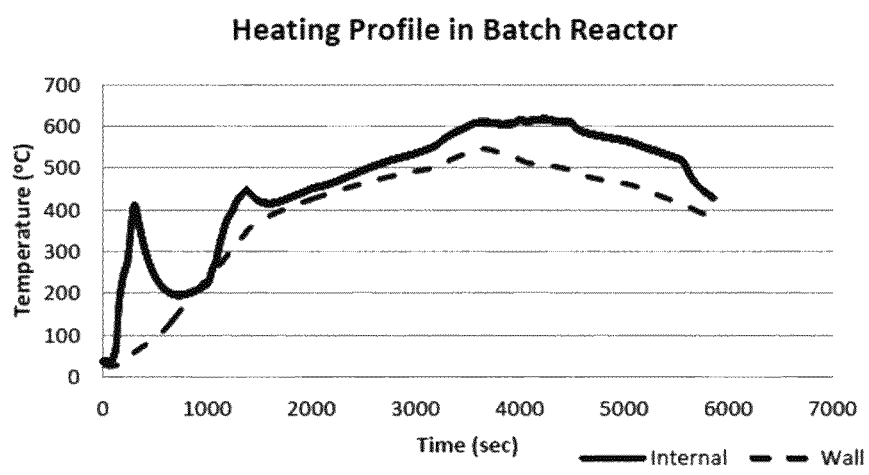

Preferred embodiments of the invention will be described in the accompanying drawings, which may explain the principles of the invention but shall not limit the scope of thereof. The drawings illustrate:

FIG. 1: a schematic three-dimensional view of pyrolytic chamber used for a pyrolysis method and a first embodiment of a pyrolysis reactor according to the invention;

FIG. 2a: a schematic diagram of a set up of a pyrolysis reactor for example as described for FIG. 1;

FIG. 2b: a further schematic diagram of a set up of a pyrolysis reactor for example as described for FIG. 1;

FIGS. 3a and 3b: a schematic view of a pyrolytic chamber of a second embodiment of a pyrolysis reactor according to the invention; and FIG. 4: a temperature/time diagram of thermal decomposition of rubber in the pyrolysis reactor according to the second embodiment of the present invention.

In the following two embodiments of a pyrolysis reactor according to the present invention are described which are suitable to perform a pyrolysis method for thermal decomposition of polymer waste materials according to the invention. In both of the embodiments, the pyrolysis reactor for thermal decomposition of polymer waste materials, particularly rubber and plastics waste materials, comprises a pyrolytic chamber 1 for accommodating the waste material and at least one heat source for heating the waste material to a decomposition temperature of the waste material. The at least one heat source preferably comprises a microwave radiation source.

The shown reactor embodiments may use microwaves in a partial vacuum or negative pressure, respectively, to sequentially pyrolyze polymer waste components. The process performed by the reactors aims to reduce the carbonaceous residue by pyrolysing the different components at different target decomposition temperatures and extracting volatiles gained in the process at different stages in the reactor.

The described reactor embodiments may be used particularly for the pyrolysis of rubber waste material with the goal of full recovery of reusable and recyclable materials. In terms of composition of the fractions produced during the pyrolysis of vulcanized rubber, the composition of the different fractions is mainly a mixture of aromatic, cyclic and aliphatic hydrocarbons. The main aliphatic and naphthene compounds found in the liquid fraction of pyrolysis of SBR are pentenes, hexenes, 4-ethenylcyclohexene and other C8 and C9 aliphatic compounds. Additionally, the SBR's co-monomer, 1,3-butadiene, is decomposed producing reactive components such as 4-ethenylcyclohexene that participate in secondary and tertiary reactions during the pyrolysis. The amount of aliphatic compounds usually increases slowly with temperature. Thus, similar proportions of aliphatic compounds can be obtained at different temperatures. In contrast, the amount of aromatic compounds increase considerably with a rise of temperature. The main aromatic compound in the liquid fraction is styrene followed by ethyl benzene, benzene, toluene and xylenes (BTX), and in a lower proportion, methylstyrenes. Benzothiazoles and thiophenes, used during vulcanization of the rubber, are also commonly found in the liquid fraction. For the gas fraction, the main products are 1,3-butadiene with a small percentage (lower than 0.5%) of methane, carbon monoxide, carbon dioxide, hydrogen sulphide, methane, ethane, propene, and n-Butane. The solid fraction, also referred to as pyrolytic char, contains mainly of the carbon black mixed into the tyre during manufacture and, in a minor proportion, carbonized rubber polymer, non-volatile hydrocarbons and residual portions of rubber additives such as zinc, sulphur, clays and silica.

Studies have shown that regardless of the use of hydrogen during the pyrolysis, low temperatures (for example 450° C.) result in the high production of carbonized rubber polymer. Similarly, the solid fraction decreases with an increase in temperature until about 550° C. Further increases in temperature may result in an increase of about 4% in the production of solids. In contrast, it was shown that high temperatures favour the production of the liquid fraction. Only about 10% of the initial material resulted in a liquid fraction for pyrolysis performed at external temperature of around 450° C. On the other hand, the highest amount of liquid fraction (about 37 wt %) was obtained at 550° C. with a constant hydrogen flow. Pyrolysis carried out at 600° C., with and without hydrogen, led to the higher production of the gas fraction and a reduction of the liquid fraction compared to samples obtained at 550° C. Studies using inert atmospheres have also reported an increase of the liquid fraction with temperature and a reduction or stabilization of the liquid yield at temperatures higher than 600° C.

The two embodiments mainly differ in the design of their pyrolytic chamber, while other features of the reactor and steps of the method are the same. Therefore, structural features of the reactor and explanations of method steps that are suitable for both embodiments shall be regarded as interchangeable between the two embodiments. Their repetition will be avoided to enhance clarity of the specification.

For example, for both embodiments it is advantageous to define the fast pyrolysis process such that volatile gases are generated in less than 4 seconds, preferably less than 2 seconds, when the waste material is heated to its decomposition temperature by microwave radiation. Also, in addition to a microwave radiation source the pyrolysis reactor may include a conductive heating source, which serves as an additional heating. Some of the volatile products produced during the thermal decomposition of a polymer waste material, such as non-condensable gases may be used to heat walls of the pyrolytic chamber, assisting with the pyrolysis process by conductive heating by the chamber walls. Alternatively, electrical heating elements may also be used for this purpose. In the same way other features and steps apply to both of the embodiments.

FIGS. 1 and 2 show an example of a pyrolytic chamber 1 of a pyrolytic reactor according to the present invention. The reactor may be in the form of a continuous flow retort with an elongated design. For example, it may comprise a conveyor to deliver polymer waste material to the pyrolytic chamber 1 and transfer the waste material and decomposed compounds thereof through the pyrolytic chamber 1.

For example, complete tires or tyre pieces can intermittently fed into the pyrolytic chamber 1 from a first end of the chamber. An air lock system 9 with means for purging of oxygen can be provided at the first end. Similarly tyre pieces can be fed into the retort with a screw feeder.

Since microwave energy heats the bulk of the waste material directly it is possible to obtain zones of product, each at a different temperature, in close proximity along the length of the reactor. That means the reactor is virtually divided into several successive heat zones for the waste material. Successive heat zones 10a to 10e are indicated the reactor variant shown in FIG. 2b.

This results in a compact system. The microwave power input can instantly be adjusted to regulate the temperature within a narrow temperature band, for optimum pyrolysis of each of the waste material components for example in a rubber tyre.

Pyrolysis gases are drawn off at intervals along the length of the pyrolytic chamber 1, wherein successive gas exit ports 2 are provided at points of increasing product temperature and the gases collected, corresponding to different components of rubber, will differ. In the variant of FIG. 2a, off-gases are collected from exit ports 2a, 2b and 2c at three positions on the side of the chamber, that correspond to 3 different product target temperatures. In the variant of FIG. 2b, off-gases are collected from five exit ports 2a, 2b, 2c, 2d and 2e, providing several exit ports along the length of the chamber 1. This allows for physical separation of the different volatile products through individual condenser systems 11a to 11e associated to the exit ports. Solid products are discharged through a second airlock system 12 or with a screw feeder at a second end of the pyrolytic chamber 1.

A multivariate process control system, such as a programmable logic controller (PLC), is used to control the pyrolysis process according to the invention. The control system can for instance measure the mass of product entering the reactor through e.g. a weigh feeder system on an infeed conveyor, as well as the temperature of the pyrolytic chamber or heat zones and off-gases at various places, and use this information to control the temperature of the reactor and the product, and regulate the microwave power to maximise production and minimise energy input.

Further, the mass flow of solid, liquid and gaseous pyrolysis products is measured with mass flow meters and load cells, to determine the ratios of products gained by the pyrolysis process. The PLC also monitors the temperature of the material, reaction vessel and volatiles exiting the reactor at the gas exit ports 2, and at the various decomposition heat zones 10 along the length of the reactor. Online and offline analysis of the pyrolysis products may also be used to provide inputs to the control system. Based on the data collected the process control system regulates the microwave power input into the reaction heat zones and the residence time of the material in the reactor. By regulating the microwave power in the different heat zones of the reactor the material is heated to predefined temperatures corresponding to target composition temperatures of differing material components to allow these components to decompose in each heat zone and the volatiles produced during the decomposition of that component, to be collected in a dedicated condenser and storage system. In subsequent heat zones the remaining material components are heated to successively higher target decomposition temperatures, each time extracting the volatile components associated with the different material components and collecting it in separate condenser systems 11. This sequential decomposition of differing material components allows the different hydrocarbons produced to be collected separately, increasing the value of the hydrocarbon feedstock produced.

A slotted waveguide feed, as shown in FIG. 1, comprising a plurality of slots 3 extending along the length of the pyrolytic chamber 1 may be used to distribute microwave radiation along the length of the pyrolytic chamber 1. Microwave radiation may be introduced at various places around the circumference of the chamber 1 and along the length of the chamber 1, to ensure uniform heating of the product. The slotted waveguide feed shown in FIG. 1 is designed in such a way that the slots 3 radiate a power profile such that more energy is emitted in the zone where the initial heating phase occurs and less towards the end of the process, where the material is substantially carbonised and an elevated temperature is maintained to ensure removal of the last traces of volatile material.

The pyrolytic chamber 1 may have an internal refractory lining 4 made from a microwave transparent material, such as alumina or mullite, to contain the heat around the tires being pyrolyzed. It also allows the microwave energy to disperse inside the refractory material, along the periphery of the reactor, for more uniform heating of the product.

The refractory lining may extend to only that part of the length of the pyrolytic chamber where the microwave power is introduced, while the remainder of the chamber may have a double wall construction to allow hot medium, like gases or heating oil, to circulate, providing conventional heating of the reactor walls to aid with the process. These may for instance be obtained by burning the non-condensable fraction of the volatiles collected.

FIGS. 2a and 2b shows variations of the pyrolysis reactor and the pyrolysis method according to the first embodiment. At the first end of the pyrolytic chamber 1 polymer waste material in form of rubber is introduced by a conveyor and transported along the length of the pyrolytic chamber 1.

In the course of the successive thermal decomposition according to the pyrolysis method of the invention the pyrolytic chamber and the rubber respectively are first heated to the first target decomposition temperature of a first material component of the rubber with in a first heat zone, by microwave radiation causing an exothermic depolymerisation reaction of the rubber. First volatile products may be evacuated through a first exit port 2a. In the variant having three heat zones shown in FIG. 2a, the temperature in the first heat zone 10a is for example 300-450° C. In the variant having five heat zones shown in FIG. 2b, the temperature in the first heat zone 10a is for example 220-250° C., preferably approximately 230° C.

Subsequently, the remaining rubber components are heated in a subsequent second heat zone, for example heat zone 10b, to a second target decomposition temperature that is higher than the first target decomposition temperature. In the variant having three heat zones shown in FIG. 2a, the temperature in the second heat zone 10b is for example 600-750° C. In the variant having five heat zones shown in FIG. 2b, the temperature in the second heat zone 10b is for example 270-320° C., preferably approximately 300° C. The second heat zone may be heated by a combination of microwave radiation and an additional heat source. During the additional heating second volatile products may be evacuated via exit port 2b distanced from the exit port 2a along the length of the chamber 1.

Accordingly, in a successive third heat zone 10c a third even higher target decomposition temperature can be applied and third volatile products may be evacuated via exit port 2c further distanced from the exit port 2b along the length of the chamber. In the variant having three heat zones shown in FIG. 2a, the temperature in the third heat zone 10b is for example 750-900° C. In the variant having five heat zones shown in FIG. 2b, the temperature in the third heat zone 10b is for example 330-370° C., preferably approximately 350° C. Further in the variant of FIG. 2b, the temperature in the fourth heat zone 10d is for example 380-420° C., preferably approximately 400° C., and in the fifth heat zone 10e for example 430-470° C., preferably approximately 450° C.

Although the heat zones 10a-10e are separated by dashed lines for illustrative reasons, the pyrolytic chamber 1 is designed as a continuous reactor and the subsequent heat zones merge into each other. Each of the heat zones has a heating port, preferably a microwave feed port 20, to heat each of the zones to the target decomposition temperature. Further, each of the heat zones may be provided with a temperature sensor 19, for example a thermocouple, to monitor the temperature and provide temperature data to a process control system (not shown).

At the second end of the pyrolytic chamber 1 carbonised material mixed with tyre steel is discharged through the airlock system 12 and may be separated using a suitable method, such as a vibrating screen 5 or the like, shown in FIG. 2a.

After passing the exit ports 2a-2e the respective volatile products enter condenser systems 11a-11e associated to the exit ports. In one embodiment such a condenser system comprises a first condenser 13 connected to a first collection vessel 14. A vacuum pump 15 is connected to the first condenser 13 and the first collection vessel 14 to provide a a negative pressure as mentioned above. Thus, the first condenser 13 and the first collection vessel 14 define a low pressure condenser and collection portion. This portion is connected to an ambient or high pressure portion comprising a second condenser 16 connected to a second collection vessel 17. Further components of the volatile product are condensed in the second condenser 16 and collected in the second collection vessel 17. A third collection vessel 18 gathers the non-condensable gases exiting from the pyrolytic chamber 1.

Although not provided with individual reference signs in FIG. 2b, each of the heat zones 10a-10e connected to the condenser systems 11a-11e comprises a first collector vessel 14, a second collector vessel 17 and a third collector vessel 16, which together provide different storage systems for the differing components exiting the pyrolysis chamber 1 at the exit ports 2a-2b. The recovered components can be extracted from the vessels for further use or appropriate disposal.

FIGS. 3a and 3b show schematic views of a pyrolytic chamber 1 of a second embodiment of the pyrolysis reactor according to the present invention. The reactor has the form of a batch reactor such as a pressure vessel that opens to accept a load of smaller tires. For example, the pyrolytic chamber 1 of the reactor is of circular shape and may be opened at the top of the circular chamber. In the shown embodiment the reactor is loaded with a single large tyre 7 such as used by earth moving equipment. Microwave radiation is applied to the pyrolytic chamber 1 through feed ports 6 in a roof of the chamber. Electrical elements or burning off some of the pyrolysis products may provide heating of the chamber walls to assist with heating and to prevent condensation inside the vessel. The microwave power is introduced through a number of microwave feed ports 6 on the roof of the vessel that are arranged in positions and orientations that ensure a uniform distribution of microwaves in the chamber 1. The chamber may also be in the shape of an annulus where the central portion 8 is removed to reduce unoccupied volume in the pyrolytic chamber 1.

In the batch reactor the temperature of the waste material is increased in heating steps to the target decomposition temperature for each differing material component and the volatile to be collected and the condensate collected in a storage dedicated to that component, switching between condensate storages for each step of the successive pyrolysis process. During the process the reactor wall temperature is also increased in heating steps to prevent re-condensation of the volatiles in the reactor. A temperature sensor 19 may be connected to the chamber 1 to report temperature within the chamber.

In each heating step volatile products are extracted from the pyrolytic chamber 1 through the exit port 2 to enter a condenser system 11. The condenser system 11 may be designed in the same manner as the condenser systems 11a-11e described for the first embodiment. Thus, the condenser system 11 may include a first condenser 13, a first collection vessel 14, a vacuum pump 15, a second condenser 16, a second collection vessel 17 and a third collection vessel 18. Although only one condenser system is shown in FIG. 3b, more such systems can be connected to the pyrolytic chamber 1.

A first condenser 13 and the first collection vessel 14 collect the hydrocarbons condensable at reduced pressure. The second condenser 16 and the second collection vessel 17, after the vacuum pump 15, collect the hydrocarbon that are condensable at ambient or positive pressure. Remaining non condensable gas is collected in the third collection vessel 18. With suitable cooling mediums the condensers can be cooled to ambient or lower temperatures to maximise the condensation of volatile components.

The graph shown in FIG. 4 depicts a heating profile of the batch reactor of FIG. 3. As can be seen, in an initial heating phase of the fast pyrolysis process the temperature rises above 400° C. within 5 minutes under microwave heating. Rapidly released volatile products of the tyre 7 may be evacuated from the pyrolytic chamber. In a subsequent heating phase, the temperature rises above 600° C. and decomposes further components of the tyre. The process was allowed to continue for an hour (3600 s) to ensure all the volatiles have been evaporated from the carbon black, although the reaction was completed within 25 minutes (1500 s).

The pyrolysis method and the pyrolysis reactor according to the present invention is based on the fact that each of the material components present in a polymer waste material has different microwave absorption properties. Microwaves directly heat the organic compounds, sulphur and carbon black to different temperatures, depending on the mix of materials present at the time. Since the sulphur can be heated and sublimed by the microwave energy, it can be evaporated from the material and removed with the pyrolysis gases during the latter stages of the sequential pyrolysis. This results in a recycled carbon black product with lower ash content.

Experiments were conducted in a batch microwave reactor, fitted with a variable power, 2 kW microwave generator and temperature regulated electric element wall heating, and produced the products listed in the table below.

| Temperature | Product collected |
| --- | --- |
| 170° C. | Naphtha |
| 230-260° C. | Naphtha |
| 300-350° C. | Middle distillate |
| 350-400° C. | Heavy oil |
| 400-450° C. | Heavy oil |

It is emphasized that the successive pyrolysis process of sequential decomposition of differing material components of a polymer waste material advantageously further develops the state-of-the-art waste material pyrolysis methods independent of the use of microwave radiation for heating the material components in successive heating steps or successive heat zones. Therefore, the applicant reserves the right to file a divisional application on a pyrolysis method and a pyrolysis reactor for thermal decomposition of polymer waste materials comprising a plurality of differing material components, particularly rubber and plastics waste materials, using a fast pyrolysis process, wherein the waste material is delivered to a pyrolytic chamber and is heated to a decomposition temperature of the waste material, whereby the polymer waste material is subjected to a sequential thermal decomposition of said differing material components by successively applying differing target temperatures (e.g. in heating steps or in differing heat zones) corresponding to a target decomposition temperature of at least one individual material component.

LIST OF REFERENCE NUMBERS 1 pyrolytic chamber
2 exit ports
3 slots
4 lining
5 vibrating screen
6 feed port
7 rubber tire
8 centre portion
9 first air lock system
10 heat zones
11 condenser system
12 second air lock system
13 first condenser
14 first collection vessel
15 vacuum pump
16 second condenser
17 second collection vessel
18 third collection vessel
19 temperature sensor
20 heating port

The invention claimed is:

1. A pyrolysis method for thermal decomposition of a waste material comprising polymer materials and polymer waste materials comprising a plurality of differing material components, using a fast pyrolysis process, comprising:
    delivering the waste material to a pyrolytic chamber;
    heating the waste material to a decomposition temperature of the polymer waste material by microwave radiation; and
    subjecting the polymer waste material to a sequential thermal decomposition of said differing material components by successively applying differing temperatures corresponding to a target decomposition temperature of at least one of the plurality of differing material components,
    wherein a target decomposition temperature equals the decomposition temperature of a specific component of the polymer waste material,
    wherein the sequential thermal decomposition comprises a first heating step in which the waste material is heated to a first target decomposition temperature of a first material component and a second heating step, which is a subsequent step, for heating the waste material to a second target temperature above said first decomposition temperature of a second material component, and
    wherein the pyrolytic chamber comprises subsequent heat zones along a length of the pyrolytic chamber that are each heated to successively higher target decomposition temperatures, and differing exit ports arranged in intervals along a longitudinal axis of the pyrolytic chamber and corresponding to the subsequent heat zones.

2. The pyrolysis method according to claim 1, wherein the microwave radiation to heat the waste material to the decomposition temperature has a power density between 30 kW and 700 kW per cubic meter of the pyrolytic chamber.

3. The pyrolysis method according to claim 1, wherein a negative pressure is applied to the pyrolytic chamber for removal of pyrolysis gases.

4. The pyrolysis method according to claim 3, wherein a negative pressure of less than 0.4 bar is applied.

5. The pyrolysis method according to claim 1, wherein differing volatile products produced from the sequential thermal decomposition of the one or more differing material components at one target decomposition temperature are extracted from the pyrolytic chamber.

6. The pyrolysis method according to claim 1, wherein for the waste material comprising the plurality of differing material components a mass of the differing material components is determined and/or
    after the sequential thermal decomposition of differing individual material components of the polymer waste material a ratio of two products resulting from the sequential thermal decomposition of differing material components is determined.

7. The pyrolysis method according to claim 1, wherein a power density of the microwave radiation and/or a residence time of products produced by the pyrolysis process are controlled according to a ratio of two products resulting from the sequential thermal decomposition of differing material components and/or a temperature applied in the pyrolytic chamber.

8. The pyrolysis method according to claim 1, wherein at last portions of volatile products produced by the pyrolysis process are used as additional heat source for conductive heating of the waste material in the pyrolytic chamber.

9. The pyrolysis method according to claim 1, wherein the fast pyrolysis process is defined in that volatile gases are generated in less than 4 seconds, when the waste material is heated to the decomposition temperature by microwave radiation.

10. The pyrolysis method according to claim 1, wherein the waste material is delivered through the subsequent heat zones.

11. The pyrolysis method according to claim 1, wherein the waste material is delivered through the pyrolytic chamber in a continuous motion by a conveyor and pyrolysis gases of the waste material are evacuated from the pyrolytic chamber in intervals during the continuous motion of the waste material at the differing exit ports in the pyrolytic chamber.

12. The pyrolysis method according to claim 1, wherein the plurality of differing material components of the polymer waste materials have different microwave absorption properties, and the plurality of differing material components with different microwave absorption properties are heated to different temperatures.

13. The pyrolysis method according to claim 1, wherein each of the differing exit ports is connected to an individual condenser system.

14. A pyrolysis reactor for sequential thermal decomposition of a waste material comprising polymer materials and polymer waste materials comprising a plurality of differing material components, comprising:
    a pyrolytic chamber configured to receive the waste material;
    at least one heat source for heating the waste material to a decomposition temperature of a material component of the waste material,
    wherein the at least one heat source comprises a microwave radiation source;
    the pyrolytic chamber comprises subsequent heat zones along a length of the pyrolytic chamber at least comprising a first heat zone and a subsequent second heat zone, and differing exit ports arranged in intervals along a longitudinal axis of the pyrolytic chamber and corresponding to the subsequent heat zones, and a process control system is connected to at least one temperature sensor in the pyrolytic chamber for controlling a sequential thermal decomposition of differing material components by successively applying differing target decomposition temperatures in the subsequent heat zones of the pyrolytic chamber, wherein the subsequent heat zones are each heated to successively increased target decomposition temperatures, wherein the first heat zone is heated to a first target decomposition temperature of a first material component and the second heat zone is heated to a second target decomposition temperature of a second material component, and wherein a target decomposition temperature equals the decomposition temperature of a specific component of the polymer waste material.

15. The pyrolysis reactor according to claim 14, wherein the pyrolytic chamber comprises an internal refractory lining made from a microwave transparent material.

16. The pyrolysis reactor according to claim 15, wherein the refractory lining extends to only a part of a length of the pyrolytic chamber where microwave radiation is introduced, while the remainder of the pyrolytic chamber optionally has a double wall construction to allow a hot medium to circulate, providing an additional heat source for the reactor walls.

17. The pyrolysis reactor according to claim 14, wherein at least one slotted waveguide feed comprising a plurality of slots extends along a length of the pyrolytic chamber.

18. The pyrolysis reactor according to claim 14, wherein a conveyor is provided to feed the waste material into and/or through the pyrolytic chamber.

19. The pyrolysis reactor according to claim 18, wherein the conveyor is a weigh feeder system comprising a mass measuring device for determining a mass of differing material components of the waste material.

20. The pyrolysis reactor according to claim 18, wherein the differing exit ports are configured to evacuate pyrolysis gases of the waste material in intervals at differing ones of the several exit ports.

21. The pyrolysis reactor according to claim 14, wherein for each of different volatile products produced by the sequential thermal decomposition a different storage system is provided.

22. The pyrolysis reactor according to claim 14, wherein the process control system is connected to a mass measuring device for determining a mass of differing material components of the waste material for controlling the sequential thermal decomposition of differing material components by successively applying differing target temperatures in the pyrolytic chamber.

* * * * *